H. TELL.
PORTABLE FENCE.
No. 171,329.  Patented Dec. 21, 1875.
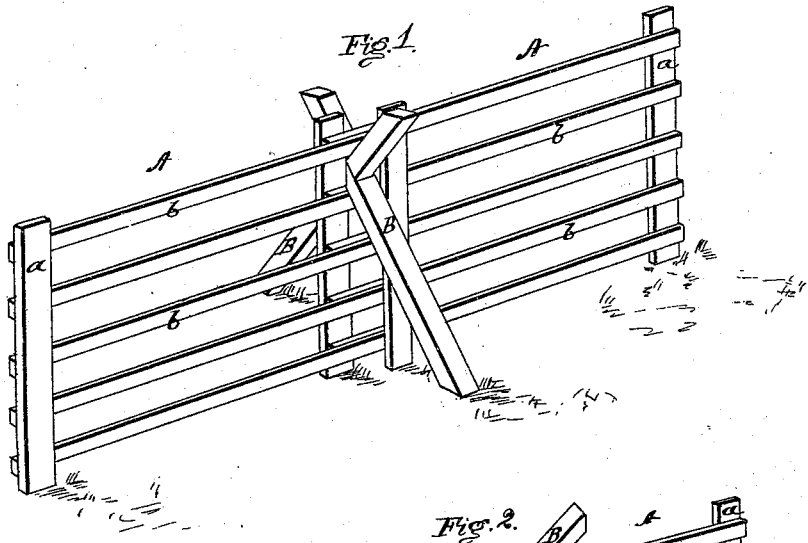
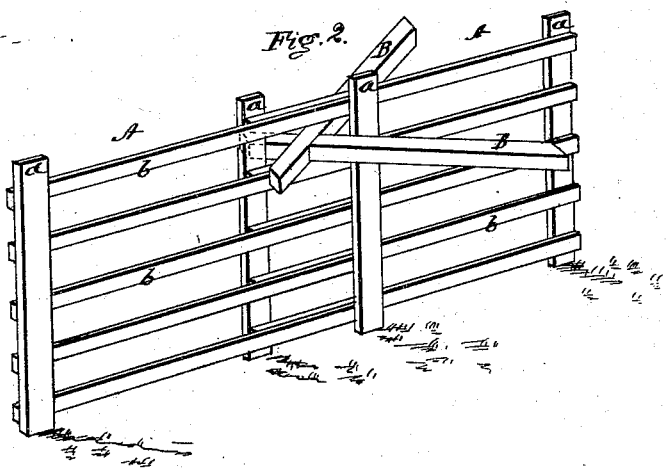
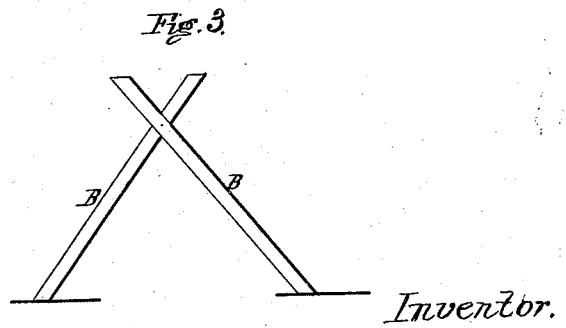
Witnesses:
F. B. Townsend
D. G. Weems
Inventor.
Horace Tell
per attys.
A. H. Evans &c.

UNITED STATES PATENT OFFICE

HORACE TELL, OF BRISTOL, MARYLAND.

IMPROVEMENT IN PORTABLE FENCES.

Specification forming part of Letters Patent No. 171,329, dated December 21, 1875; application filed October 15, 1875.

*To all whom it may concern:*

Be it known that I, HORACE TELL, of Bristol, Maryland, have invented certain new and useful Improvements in Fences, of which the following is a full, clear, and exact description, reference being had to the accompanying drawings, making a part of this specification, in which—

Figure 1 represents a section of fencing in position. Fig. 2 represents the same partially in position. Fig. 3 is a separate view of the brace.

The object of my invention is to provide a cheap and easily-constructed fence, and one which can be readily transported from one place to another; and it consists in the combination of parts hereinafter described and claimed.

To enable others skilled in the art to make and use my invention, I will proceed to describe the exact manner in which I have carried it out.

The sections or panels A A of my fence I construct with vertical braces $a$ at each end, and with as many horizontal slats or bars $b\ b$ as may be desired, five being the number usually preferred. These slats or bars are so secured that the several panels will exactly register or correspond, the distance between the slats gradually diminishing as they near the ground. The supports B B are framed together, as shown in Fig. 3.

To put up my fence, the ends of two panels are brought together with the horizontal slats turned inward and lying contiguous to each other, and the vertical braces being outside, as shown in Fig. 2. The brace B is then passed in between the two upper rails and turned in position as shown in Fig. 2. The panels are then expanded or drawn lengthwise until the brace B is caught between the vertical braces $a\ a$, as shown in Fig. 1, when the fence will be found to be securely braced.

A portable fence thus constructed is exceedingly simple and cheaply made, and can readily be moved and handled by farm-hands.

Having thus described my invention, what I claim as new, and desire to secure by Letters Patent, is—

The combination, with the panels A A, made to coincide, and provided with a vertical brace at each end, of the cross-braces, framed together as shown and described, and passed between and binding on the top and second bars of the panels, for the purpose specified.

HORACE TELL.

Witnesses:
WILL. H. MOXON,
DAVID G. WEEMS.